United States Patent [19]
Hope et al.

[11] Patent Number: 5,277,951
[45] Date of Patent: Jan. 11, 1994

[54] MARKING OF LINED PIPE SEGMENTS, FITTINGS, OR VALVES

[75] Inventors: Arthur W. Hope, Munger; James A. Yanacek, Midland, both of Mich.

[73] Assignee: The Dow Chemical Company, Midland, Mich.

[21] Appl. No.: 886,795

[22] Filed: May 21, 1992

[51] Int. Cl.$^5$ .......................................... F16L 23/032
[52] U.S. Cl. ................................. 428/36.9; 428/421; 428/422; 428/522; 428/523; 428/36.91; 428/36.92
[58] Field of Search ................ 428/36.9, 36.92, 36.6, 428/36.7, 192, 195, 914, 421, 422, 522, 523; 138/109, 104, 98; 285/55, 45, 93; 264/296, 132, 269

[56] References Cited

U.S. PATENT DOCUMENTS

| | | | |
|---|---|---|---|
| 3,390,442 | 7/1968 | Sosnowski et al. | 138/98 |
| 3,413,743 | 12/1968 | Goodhue | 264/132 |
| 3,651,191 | 3/1972 | Glatt et al. | 264/132 |
| 4,267,863 | 5/1981 | Burelle | 138/109 |
| 4,818,314 | 4/1989 | Britain et al. | 156/87 |

*Primary Examiner*—Ellis P. Robinson
*Assistant Examiner*—Michael A. Williamson

[57] ABSTRACT

The subject invention pertains to a thermoplastic-lined pipe segment, fitting, or valve bearing a marking on a tab extending radially from a portion of the thermoplastic liner molded over a flange.

5 Claims, 1 Drawing Sheet

MARKING OF LINED PIPE SEGMENTS, FITTINGS, OR VALVES

FIELD OF INVENTION

This invention pertains to a thermoplastic-lined pipe segment, fitting, or valve bearing a marking on a tab extending radially from a portion of the thermoplastic liner sealing face molded over a flange.

BACKGROUND OF INVENTION

Currently available and well known plastic lined piping products comprise a family of pipes, fittings, and valves especially designed for handling corrosive or high purity liquids. Such products generally comprise steel lined with a polymeric material, e.g., polyvinylidene chloride, polypropylene, polyvinylidene fluoride, perfluoroalkoxy copolymer, fluorinated ethylene-propylene copolymer and polytetrafluoroethylene. Such products enjoy both the structural integrity of steel and the high chemical resistance characteristic of the selected polymeric liner.

Each pipe, fitting, and valve will contain a flange at or substantially near each end thereof. Adjacent pipes, fittings, and valves within a given pipeline may be joined one to another by the fastening together of such flanges, e.g., by bolting.

Fittings are used to join pipe segments of differing diameter, to join pipe segments which are not positioned end-to-end, to join more than two pipe segments at a particular point, to provide instrument connections and sample ports, etc. Fittings are typically lined by injection molding thermoplastic material into a region defined by the fitting and a mold portion.

To prevent leakage at the flanges, adjacent thermoplastic liner portions must be brought together and sealed. To ensure flange sealability, the sealing surfaces of adjacent thermoplastic liner portions should be free from deformations.

It has recently become well known to identify plastic parts by injection molding such information as the production date into the plastic during fabrication. It would be beneficial to likewise identify the production date of thermoplastic-lined pipe segments, fittings, and valves.

The industry would find great advantage in parts identified by information such as lot number or production date, provided such identification does not interfere with flange sealability.

SUMMARY OF INVENTION

Accordingly, this invention provides an article comprising:
  a pipe segment, fitting, or valve having at least one flange associated therewith, said flange having an opening extending therethrough,
  a thermoplastic liner extending through said opening and having a molded face portion adjacent a portion of said flange adjacent said opening, said molded face portion being in part defined by a sealing surface; and
  a tab extending radially from said molded face portion bearing a raised or recessed marking, said tab and said marking being recessed from said sealing surface.

Such tab and marking may be advantageously formed during the injection molding of the thermoplastic liner within the pipe segment, fitting, or valve.

These and other embodiments are more fully described in the following detailed description, taken in conjunction with the appended drawings, wherein.

DETAILED DESCRIPTION

Figure 1:
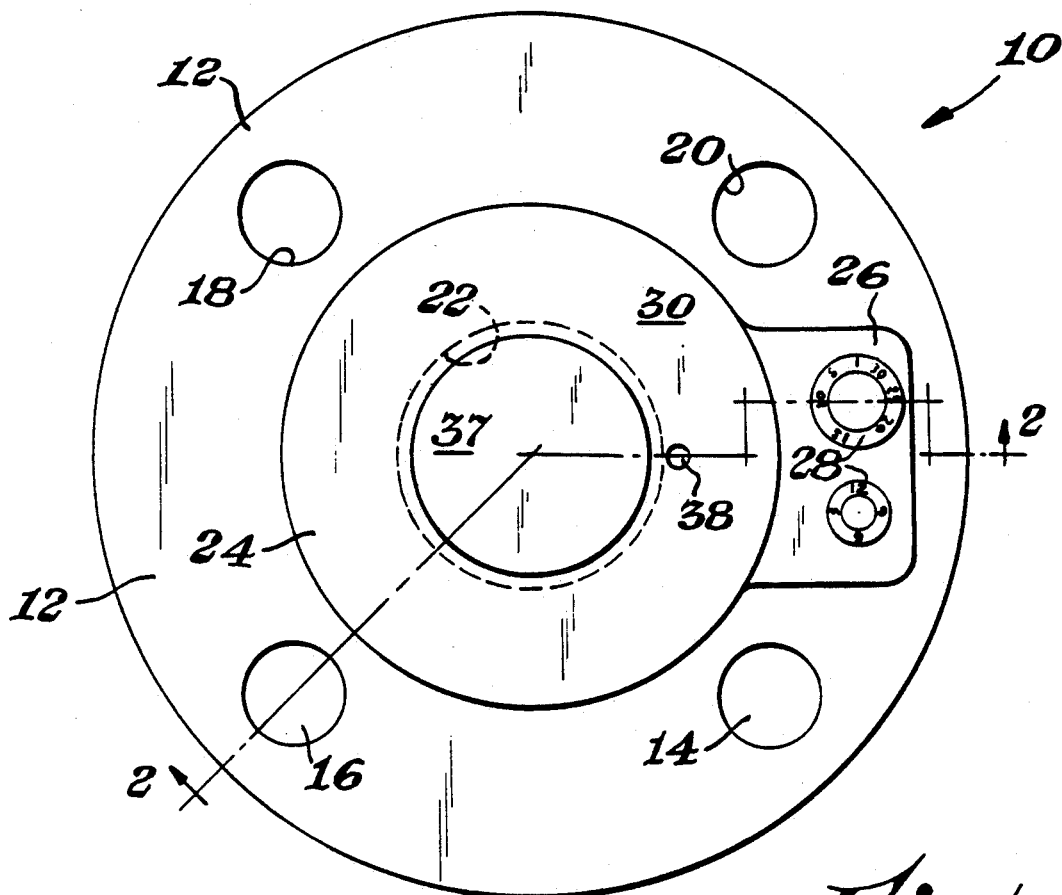
FIG. 1 is a top plan view of a fitting of the subject invention.

FIG. 1 is a top plan view of a fitting 10 of the subject invention. Fitting 10 has a flange 12 associated therewith. Flange 12 has bolt holes 14, 16, 18, and 20 extending therethrough. Flange 12 further has an opening 22 extending from the interior of fitting 10 therethrough. A thermoplastic liner extends through opening 22 and is integral with face portion 24. Tab 26 extends radially from face portion 24 and bears a marking 28.

The pipe segments, fittings, and valves of the subject invention may be advantageously formed by injection molding. As is known in the art, the injection molding of pipe segments, fittings, and valves may be accomplished by providing a mandrel within the pipe segment, fitting, or valve, and attaching end caps to cover each opening extending through a flange, wherein the mandrel, the end caps, and the inner wall of the pipe segment, fitting, or valve serve to define a region into which thermoplastic material may be injected. The injection of the thermoplastic material simultaneously forms a liner and a molded face portion. To form the tab of the subject invention, the end plate may be formed with a corresponding recessed portion. To form the marking within the tab, the recessed portion of the end plate may be provided with a disrupted surface, i.e., with either a raised reflected marking or a recessed reflected marking. By "reflected", it is meant that a mirror image of the marking will be transferred to the tab.

Figure 2:
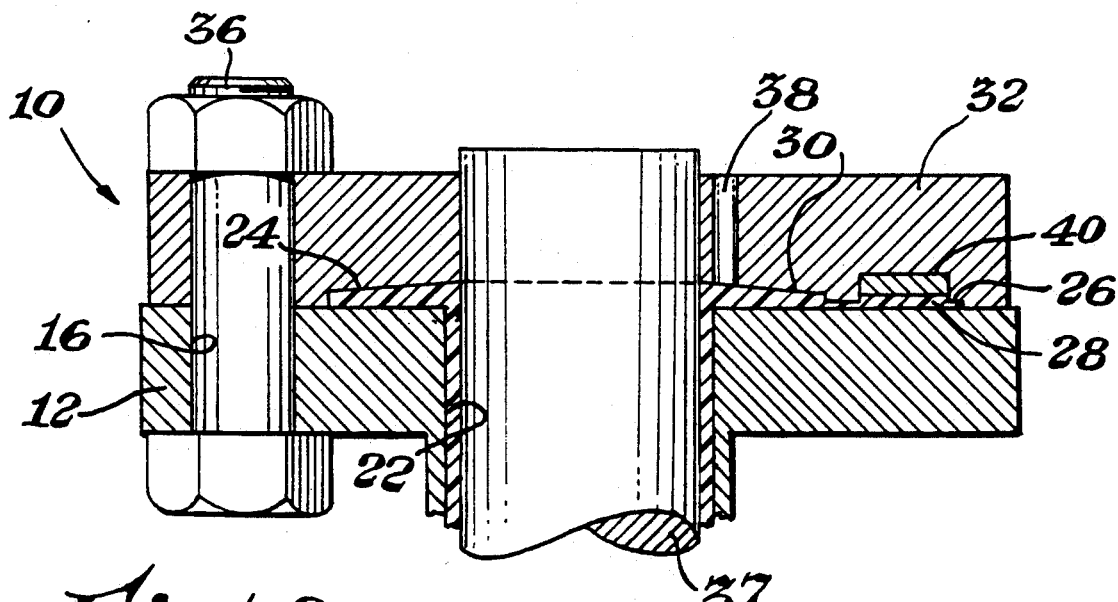
FIG. 2 is a side sectional view of the fitting of FIG. 1 taken along line 2—2 during fabrication, in combination with a similarly sectioned bolted end plate and a mandrel.

FIG. 2 is a side elevational view of the fitting 10 of FIG. 1 in combination with a bolted end plate. FIG. 2 illustrates one manner of forming a fitting of the subject invention. The reference numerals common to FIGS. 1 and 2 are as defined with respect to FIG. 1.

To form fitting 10, end plate 32 is bolted onto pipe flange 12 by, e.g., bolt 36. Other bolts are not shown for the sake of clarity. Mandrel 37 is provided within opening 22. Liquid thermoplastic material is injected into the region defined by mandrel 37, the inner wall defining opening 22, pipe flange 12, and end plate 32, forming pre-cut flared portion 25, tab 26, and marking 28. When such thermoplastic material has cooled and set, mandrel 37 and end plate 32 are removed. A portion of pre-cut molded face portion 25 is cut away and removed to form face portion 24 having sealing surface 30 (indicated by the dashed line).

In one preferred embodiment of the invention, the recessed portion of the end plate will be provided with one or more mold inserts 40. Such inserts may usefully imprint into the tab information such as company logo or production date/lot number. In particular, date inserts mold day, month, or year into the recessed tab. Typically, such inserts may be adjusted to change the day, month, or year to reflect, e.g., the lot number of the thermoplastic-lined pipe segment, fitting, or valve. Such inserts are available from, e.g., D-M-E Company (Madison Heights, Mich.).

The subject invention may employ any thermoplastic material which can be injection molded. Preferred thermoplastic materials will have a chemical resistance suitable for the intended end use application, i.e., they will resist the materials with which they will be contacted. Especially preferred thermoplastic polymers include polyvinylidene fluoride, polypropylene, polyvinylidene chloride, perfluoroalkoxy (PFA) copolymer (available from E. I. DuPont de Nemours Inc., Wilminghton, Del.), and fluorinated ethylenepropylene (FEP) copolymer (available from E. I. DuPont de Nemours Inc., Wilminghton, Del.).

While polytetrafluoroethylene (PTFE) is not typically viewed as suitable for injection molding, the subject invention may be employed with PTFE in the following manner. A pipe segment, fitting, or valve is provided with a mandrel and end plate as in FIG. 2. The end plate may be provided with a recessed portion suitable to form a tab extending radially from the molded face portion of the liner. PTFE resin powder is introduced and compacted into the region defined by the inner wall of the pipe segment, the mandrel, the flange face, and the end plate. The pipe segment, fitting, or valve is then heated to sinter the PTFE. The marking may be provided on the tab by heating the tab and pressing such marking into the softened PTFE. While for some purposes, PTFE may not be classified as a thermoplastic, for the instant application PTFE has sufficient thermoplastic properties to receive and retain the marking described and therefore is here classified as thermoplastic. In general, the mold inserts discussed with respect to FIG. 2 will not be preferred in polytetrafluoroethylene applications, as the compaction procedure will not generally offer the degree of resolution possible through injection molding.

These and other embodiments will be recognized by those of skill in the art. Accordingly, the scope of the subject invention shall be limited only by the appended claims.

What is claimed is:

1. An article comprising a pipe segment, fitting, or valve having at least one flange associated therewith, said flange having an opening extending therethrough,
   a thermoplastic liner extending through said opening and having a flared, portion adjacent a portion of said flange adjacent said opening, said flared portion portion being in part defined by a sealing surface; and
   a thermoplastic tab extending radially from said flared portion, said tab bearing a raised or recessed marking, said tab and said marking being recessed from said sealing surface.

2. An article of claim 1, wherein said thermoplastic liner is polyvinylidene fluoride, polypropylene, polyvinylidene chloride, perfluoroalkoxy copolymer, or fluorinated ethylene-propylene copolymer.

3. An article of claim 1, wherein said thermoplastic liner is polytetrafluoroethylene.

4. An article of claim 1, wherein said flared portion, tab, and marking are formed during injection molding of said thermoplastic liner.

5. An article of claim 1, wherein said marking comprises a date, company logo, a production lot number or a combination thereof.

* * * * *